J. W. HUGHES.
GEARING FOR MECHANICAL DEVICES.
APPLICATION FILED DEC. 9, 1913.
1,123,747.  Patented Jan. 5, 1915.
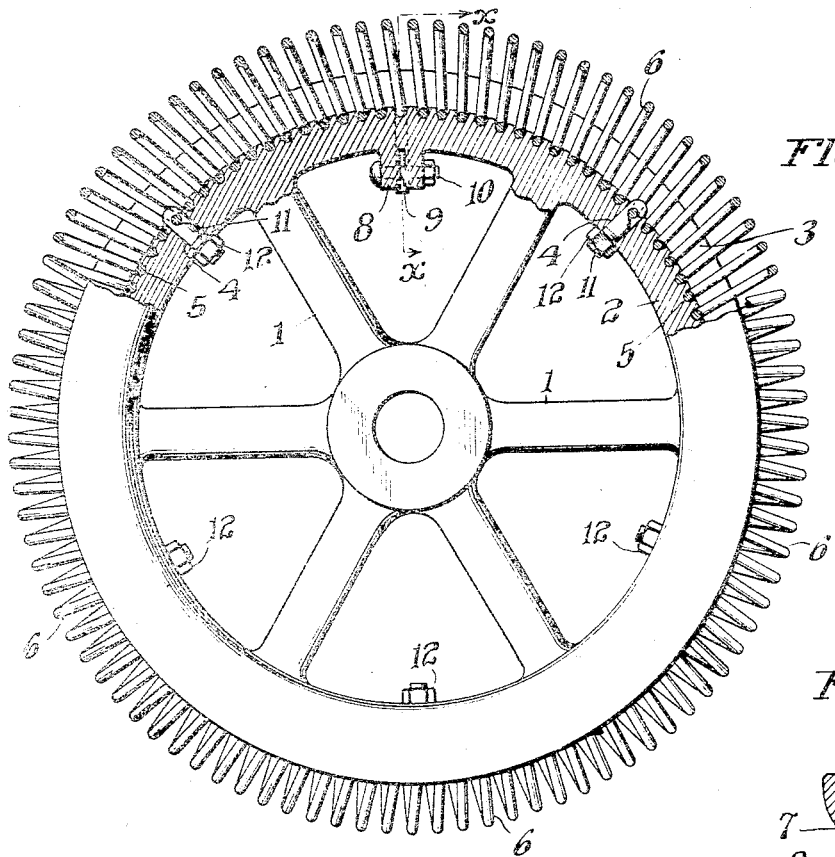
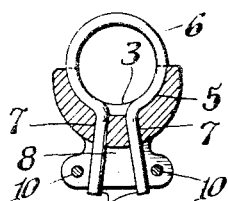
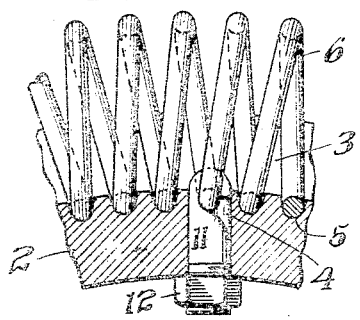
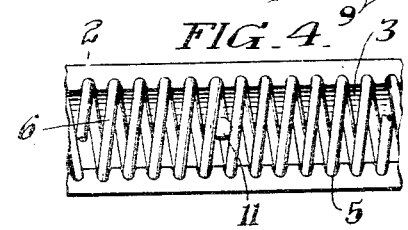
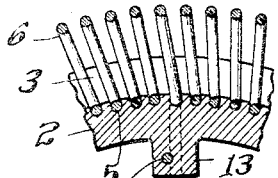
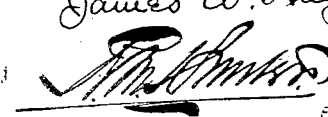
Witnesses
Daniel Webster Jr.
E. W. Smith
Inventor
James W. Hughes
By
Attorney

UNITED STATES PATENT OFFICE.

JAMES W. HUGHES, OF NARBERTH, PENNSYLVANIA.

GEARING FOR MECHANICAL DEVICES.

1,123,747.  Specification of Letters Patent.  Patented Jan. 5, 1915.

Application filed December 9, 1913. Serial No. 805,499.

*To all whom it may concern:*

Be it known that I, JAMES W. HUGHES, citizen of the United States, and resident of Narberth, county of Montgomery, and State of Pennsylvania, have invented an Improvement in Gearing for Mechanical Devices, of which the following is a specification.

My invention has reference to gearing for mechanical devices generally, and relates more particularly to a helical or spiral type of gearing consisting of certain improvements which are fully set forth in the following specification and shown in the accompanying drawings which form a part thereof.

The object of my invention is to provide a helical gear for the purpose of transmitting power with a maximum efficiency, which end is accomplished by a novel combination of elements the action of which is to reduce friction to a minimum without affecting in any manner the energy of transmission.

It has for a further object to provide a gear of helical construction which is adapted to mesh with a gear of similar type and transmit power thereto irrespective of whether or not the two gears are directly alined with each other, that is to say, transmission from one gear to another may take place even though the two gears are angularly disposed with respect to each other.

My invention further comprehends a wheel body having grooves formed in the periphery thereof which are adapted to serve the purpose of seats or retainers for a convolution or convolutions of the novel helical member or coil which forms the gear teeth, all of said parts being locked or held in assembled condition by a retaining means forming one element of the combination.

Figure 1 represents a side elevation partly in section of a portion of a gear embodying my invention; Fig. 2 represents a section on line x—x of Fig. 1; Fig. 3 represents an enlarged detail of one of the fastening devices; Fig. 4 represents a plan of a portion of the gear; and Fig. 5 represents a modified form of fastening device.

Referring to the drawings, similar numerals of reference indicate corresponding parts.

1 designates a wheel body of suitable material having a rim 2 which in sectional configuration is substantially semi-circular in order to form a circumferential groove extending continuously about the aforesaid rim 2 and providing the curved surface 3. The said rim 2 at suitable intervals is radially apertured as shown at 4 to receive suitable fastening devices which will be described later in connection with their coöperating adjuncts. The surface 3 in the present instance is machined to form a plurality of transverse grooves 5 extending at intervals spaced according to a predetermined pitch throughout the circumference of the rim 2, and it will be noted that each of the grooves 5 forms a portion of the same helix, that is to say, if we assume an imaginary helix to be developed and intersecting the surface 3, each of the grooves 5 will coincide respectively with a portion of a convolution of the helix. These grooves 5 provide seats for the respective convolutions of a wire 6 or like length of material which is disposed about the surface 3 and forms the teeth of a helical or spiral gear. In the preferred form of my invention all of the teeth are formed by a continuous length of material, the ends of which terminate in close proximity to each other and are respectively passed through the openings 7 provided in the rim 2 for that purpose. Adjacent the aforesaid openings 7 and on the inner side of the rim 2 I have provided a pair of lugs 8 which are spaced sufficiently to receive the ends 9 of the helix 6, and the said lugs are suitably apertured to receive bolts 10 which serve to clamp the lugs and firmly hold the ends of the material against displacement.

11 designates a number of hook bolts, located respectively in the openings 4 and adapted to engage the convolutions of the helix 6 while the opposite ends of the bolts project through the rim 2 to receive the nut 12, whereby the said bolts may be drawn tight and securely maintain the helix in position or assembled condition.

In the modification shown in Fig. 5, I have provided a construction which eliminates the clamping means for securing the ends of the coil, and in place thereof I utilize a single lug 13 which is transversely bored to receive a pin or key 14 which may act either as a wedge to secure the ends 9, or the latter may be grooved as shown in Fig. 5 to receive a portion of the pin and thus prevent displacement of the ends when the gear is in operation.

While I have in the foregoing description explained one form of the invention which is at present preferred by me, I wish it understood that the invention is not limited in its scope to the present embodiment, as the helical member may be variously arranged with respect to the wheel body and secured thereto by a variety of constructions, nor do I wish to be limited to the number or arrangement of the grooves in which the spiral member is seated. A combination of the parts in which only certain of the convolutions of the helix are seated in the grooves embodies a construction within the scope of my invention, and I therefore do not desire to be limited to the number of grooves or their relation to the convolutions of the helix.

It will be apparent from the present disclosure that I have devised a complete operative gear structure of a spiral or helical type wherein a coil of material of more or less yielding nature is employed to form the gear teeth and therefore it will be evident that when the said teeth mesh with a similar gear the action will be substantially noiseless, free running, but yet capable of exerting an enormous power transmitting action with a minimum of friction. It will further be apparent that the gear of my invention is designed for use in connection with substantially all types of gearing, being particularly adaptable for transmission gears of automobiles, hoisting mechanism or like machines.

Having thus described my invention, what I claim and desire to protect by Letters Patent is:—

1. In a device of the character stated, a wheel body having a circumferential groove in the rim thereof forming a suitable surface substantially semi-circular in cross-section, said surface having a plurality of transverse grooves therein extending from one edge to the other, each of said grooves forming a part of the same helix, a coil of helical form having a substantial portion thereof seated in said grooves, and means to secure said coil in assembled condition.

2. In a device of the character stated, a wheel body having a circumferential groove in the rim thereof forming a suitable surface, said surface having a plurality of transverse grooves therein, a coil of suitable material positioned about said surface, a substantial portion of the convolutions of said coil being seated respectively in said grooves to form a positive power transmitting means, and means to secure said coil in assembled condition.

3. In a device of the character stated a wheel body having a circumferential groove in the rim thereof, forming a suitable surface substantially semi-circular in cross section, said surface having a plurality of transverse grooves therein, and a pair of substantially radial openings therethrough, certain of said grooves forming a part of the same helix, a coil of helical form having a substantial portion of each convolution seated in said grooves, and having its ends respectively located in said openings, means for locking said ends in said openings, and means located at intervals about said ring for holding said coil seated in said groove.

4. In a device of the character stated, a wheel body having a circumferential groove in the rim thereof, forming a suitable surface, said surface having a plurality of transverse grooves therein, and a pair of substantially radial openings therethrough, certain of said grooves forming a part of the same helix, a coil of helical form having a substantial portion of each convolution seated in said grooves, and having its ends respectively located in said openings, means for locking said ends in said openings, and a plurality of hook bolts passing through said rim and engaging said coil at a plurality of points to hold said coil in assembled condition.

5. A gear consisting of a wheel body having an annular groove about its periphery and of approximately semi-circular shape in cross section, said groove having its walls provided with transverse grooves, said grooves in sinuous form combined with a helical coil of wire arranged in annular form about the body and having the inner loops of the coils fitting into the transverse sinuous shaped grooves.

6. A gear consisting of a wheel body having an annular groove about its periphery and of approximately semi-circular shape in cross section, said groove having its walls provided with transverse grooves, said grooves in sinuous form combined with a helical coil of wire arranged in annular form about the body and having the inner loops of the coils fitting into the transverse sinuous shaped grooves, and means for holding the helical wire upon the wheel body and within the transverse grooves thereof.

In testimony of which invention, I hereunto set my hand.

JAMES W. HUGHES.

Witnesses:
  R. M. Hunter,
  Horace D. Reeve.